H. A. LUDTKE.
PLOW.
APPLICATION FILED AUG. 13, 1906. RENEWED FEB. 10, 1909.

916,466.  Patented Mar. 30, 1909.

Witnesses  
W. S. Rockwell  
F. B. MacNab

Inventor  
Henry A. Ludtke  
By Chandler & Chandler  
Attorneys

UNITED STATES PATENT OFFICE.

HENRY A. LUDTKE, OF AMBOY, MINNESOTA.

PLOW.

No. 916,466.  Specification of Letters Patent.  Patented March 30, 1909.

Application filed August 13, 1906, Serial No. 330,327. Renewed February 10, 1909. Serial No. 477,218.

*To all whom it may concern:*

Be it known that I, HENRY A. LUDTKE, a citizen of the United States, residing at Amboy, in the county of Blue Earth, State of Minnesota, have invented certain new and useful Improvements in Plows; and I do hereby declare the following to be a full, clear, and exact description of the invention, such as will enable others skilled in the art to which it appertains to make and use the same.

This invention has reference to plows, its object being the construction of an efficient, durable, and readily operated device of that class, adapted especially for use in killing the weed generally known as "quack grass".

Heretofore it has been necessary to double plow a field covered with "quack grass", forming the first furrow three inches deep, and then following over the plowed ground at an increased depth of seven inches, the completed furrow having a depth of ten inches. To overcome the considerable amount of time thus lost, the plow forming the subject of this application has been devised, combining in a single device a pair of mold-boards set one in advance of the other, and adapted to cut and throw out respectively the upper growth and the roots of the weed, the nature of which renders the separate cuttings necessary owing to the wide spread of its roots in the soil.

With this end in view, the invention consists in the construction, combination, and arrangement of parts, all as hereinafter fully described, specifically claimed, and illustrated in the accompanying drawings, in which—

Figure 1:
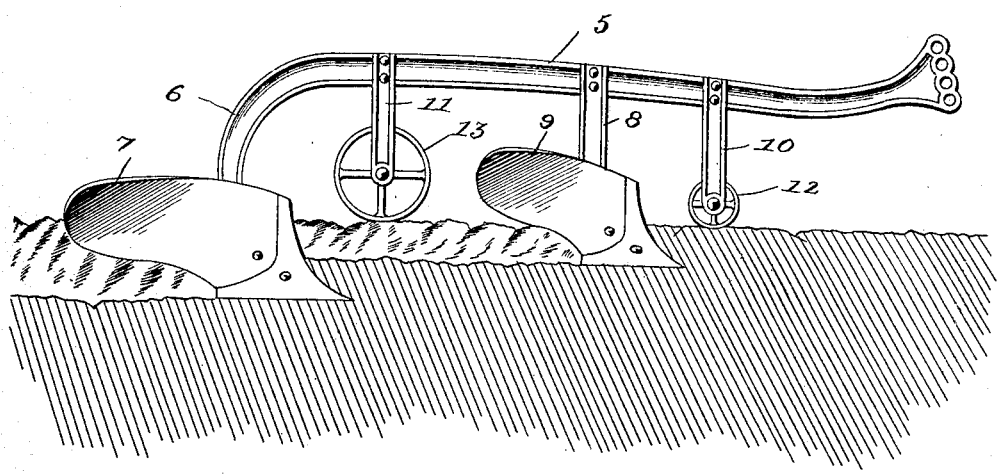
Figure 2:
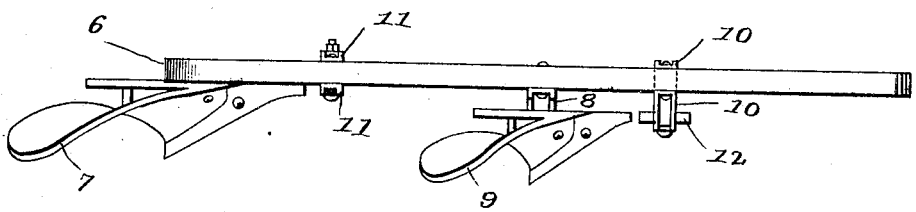

Figure 1 is a side elevation of the invention. Fig. 2 is a top plan view of Fig. 1.

Like parts are designated by corresponding reference numerals in the several views.

As shown in the drawings, the plow comprises a beam 5 terminating in a standard 6, to the foot of which is secured the rear mold-board 7. Secured to the plow beam about three feet in advance of the rear standard 6 is the front standard 8 having the mold-board 9 secured to its foot.

The length of the front standard 8 is so proportioned to that of the rear standard 6, that the lower edge of the front mold-board is seven inches above that of the rear mold-board, while the distance between the tip of the blades of the mold-boards is approximately two feet.

Located a slight distance in advance of the standards 8 and 6 are depending metal brackets 10 and 11, provided with rotating gage wheels 12 and 13 respectively, mounted therein, and of approximately twelve and eighteen inches in diameter respectively. The fore bracket 10 and standard 8 are bent slightly outward thus setting their gage wheel and mold-board to one side of the rear gage wheel and mold-board. When the draft animals are hitched to the front end of the plow beam, and are started, it will be seen that in each instance a furrow three inches deep is formed by the front mold-board, which is deepened to an extent of ten inches by the action of the rear mold-board. The quack grass will thus receive two separate cuttings in two separate vertical planes, owing to the offset position of the front mold-board and gage wheel, thus effecting completely the removal of the upper growth and roots of the weed.

I am aware that revolving gage wheels have been used in connection with mold-boards, and that in some instances two shovels have been used in a single plow, and I do not broadly claim that combination, but I am not aware of any instance in which two mold-boards and gage wheels have been used on a single plow beam, and in which the front gage wheel and mold-board have been slightly offset from the rear gage wheel and mold-board to cause two separate cuttings with only a single furrow.

What is claimed, is—

A plow comprising, in combination, a beam including front and rear depending standards arranged in spaced relation to each other; a mold-board secured to the lower end of each standard, the front standard being of less length than the rear standard, and being bent laterally outward, whereby the mold-board secured thereto will be disposed to one side of the rear mold-board, with its cutting edge elevated above that of the latter, to effect two separate cuttings at different depths and in different vertical planes; a depending bracket secured in advance of each standard, the front bracket being bent laterally outward into alinement with the front standard; and a rolling gage-wheel secured to the foot of each bracket directly in alinement with the blade of the corresponding mold-board.

In testimony whereof, I affix my signature, in presence of two witnesses.

HENRY A. LUDTKE.

Witnesses:
  W. E. SCHMIDT,
  F. E. WILDER.